(12) United States Patent
Garrn et al.

(10) Patent No.: US 12,485,491 B2
(45) Date of Patent: Dec. 2, 2025

(54) TOOL WITH WEAR DETECTION

(71) Applicant: Guehring KG, Albstadt (DE)

(72) Inventors: Immo Garrn, Ettingen (DE); Peter Gluche, Bellenberg (DE)

(73) Assignee: Guehring KG, Albstadt (DE)

( * ) Notice: Subject to any disclaimer, the term of this patent is extended or adjusted under 35 U.S.C. 154(b) by 449 days.

(21) Appl. No.: 18/081,635

(22) Filed: Dec. 14, 2022

(65) Prior Publication Data

US 2023/0182211 A1    Jun. 15, 2023

(30) Foreign Application Priority Data

Dec. 14, 2021    (EP) .................................... 21214441

(51) Int. Cl.
B23B 27/14    (2006.01)

(52) U.S. Cl.
CPC .......... *B23B 27/14* (2013.01); *B23B 2226/27* (2013.01); *B23B 2226/31* (2013.01);
(Continued)

(58) Field of Classification Search
CPC ............ B23B 2226/27; B23B 2226/31; B23B 2228/04; B23B 2228/105; B23B 2228/24;
(Continued)

(56) References Cited

U.S. PATENT DOCUMENTS 10,118,229 B2 * 11/2018 Waki ...................... B23B 27/14
10,974,360 B2 *  4/2021 Garrn ...................... C23C 16/27
(Continued)

FOREIGN PATENT DOCUMENTS

CN    105992835 A  * 10/2016
CN    107207546 A  *  9/2017
(Continued)

OTHER PUBLICATIONS

Wang et al., "Tribological performance and wear mechanism of smooth Ultrananocrystalline diamond films," Journal of Materials Processing Technology, vol. 290, Nov. 25, 2020, p. 116993, XP055924705 (13 pages).
(Continued)

*Primary Examiner* — Jennifer H Gay
(74) *Attorney, Agent, or Firm* — Imperium Patent Works; Darien K. Wallace

(57) ABSTRACT

A coated tool, such as a rotating, cutting tool, includes a tool body and a multilayer wear protection coating system. The wear protection system coats a functional surface of the tool body that is subject to wear and includes a first undoped diamond layer and a second undoped diamond layer disposed over the first undoped diamond layer. The first undoped diamond layer is electrically conductive and exhibits grain boundary conductivity from delocalized electrons. The second undoped diamond layer is electrically insulating. The first undoped diamond layer is 4-20 microns thick and is made with diamond grains whose size ranges from 4-10 nm. The first and second diamond layers are applied by chemical vapor deposition (CVD) using a hot-wire method. The wear protection system also includes an additional undoped diamond layer that is electrically insulating and is disposed between the functional surface of the tool body and the first diamond layer.

19 Claims, 7 Drawing Sheets

(52) U.S. Cl.
CPC ..... *B23B 2228/04* (2013.01); *B23B 2228/105* (2013.01); *B23B 2228/24* (2013.01); *B23B 2228/36* (2013.01); *B23B 2228/41* (2013.01); *B23B 2228/44* (2013.01)

(58) Field of Classification Search
CPC ............ B23B 2228/36; B23B 2228/41; B23B 2228/44; B23B 27/14; C23C 16/271; C23C 28/044; C23C 28/048; C23C 28/42
See application file for complete search history.

(56) References Cited

U.S. PATENT DOCUMENTS

| | | | |
|---|---|---|---|
| 2005/0224806 A1* | 10/2005 | Gluche | H10D 1/472 257/77 |
| 2009/0017258 A1* | 1/2009 | Carlisle | C23C 16/271 427/249.8 |
| 2009/0022969 A1* | 1/2009 | Zhang | C23C 30/005 428/216 |
| 2015/0345011 A1* | 12/2015 | Choi | C23C 16/271 204/290.15 |
| 2016/0186363 A1 | 6/2016 | Merzaghi et al. | C30B 28/14 |
| 2016/0243625 A1* | 8/2016 | Waki | B23B 51/02 |
| 2018/0223415 A1* | 8/2018 | Albers | C23C 14/0641 |
| 2018/0305810 A1* | 10/2018 | Kumar | C23C 16/27 |
| 2020/0094364 A1* | 3/2020 | Garrn | C23C 16/27 |
| 2020/0283891 A1* | 9/2020 | Garrn | C23C 16/46 |
| 2023/0182211 A1* | 6/2023 | Garrn | C23C 28/044 407/119 |

FOREIGN PATENT DOCUMENTS

| | | | | |
|---|---|---|---|---|
| CN | 110983293 A | * | 4/2020 | |
| CN | 115008550 A | * | 9/2022 | ................ B26F 1/16 |
| DE | 20304580 U1 | * | 9/2004 | |
| EP | 0596619 A1 | * | 5/1994 | |
| EP | 3257968 A1 | | 12/2017 | |
| KR | 20080110756 A | * | 12/2008 | ........... H10K 50/805 |
| WO | WO2018/166941 A1 | | 9/2018 | |
| WO | WO-2019065949 A1 | * | 4/2019 | |
| WO | WO-2024107840 A1 | * | 5/2024 | |

OTHER PUBLICATIONS

Salgueiredo et al., "Mechanical performance upgrading of CVD diamond using the multilayer strategy," Surface & Coatings Technology, vol. 236, Oct. 18, 2013, pp. 380-387, XP028788625 (8 pages).

Harniman et al., "Direct observation of electron emission from grain boundaries in CVD diamond by PeakForce-controlled tunnelling atomic force microscopy," Carbon, vol. 94, Jul. 2, 2015, pp. 386-395, XP055923857 (10 pages).

Extended European search report dated Jun. 3, 2022, from the European Patent Office in the parent European application EP21214441.4 an English translation of the search report (21 pages).

* cited by examiner

| manufacturing examples 1-30 | | H₂ mass flow (sccm) | CH₄ mass flow (sccm) | coating temp. (°C) | pressure (hPa) | coating time (hours) | coating thickness (μm) | grain size (nm) | electrical conductivity (S/cm) |
|---|---|---|---|---|---|---|---|---|---|
| add'l undoped diamond layer | — | 1500 | 22 | 650 | 5 | 4 | 1 | 113.4 | $3.3 \times 10^{-8}$ |
| first electrically conductive undoped diamond layer | A | 1500 | 105 | 700 | 5 | 17 | 1 | 5.3 | 10.13 |
| | B | 2000 | 92 | 700 | 9 | 19 | 1 | 5.9 | 10.01 |
| | C | 1500 | 100 | 750 | 3 | 15 | 1 | 4.8 | 11.78 |
| | D | 1500 | 44 | 650 | 5 | 40 | 8 | 20.7 | $5.4 \times 10^{-6}$ |
| | E | 1500 | 45 | 700 | 3 | 32 | 8 | 15.1 | $9.8 \times 10^{-6}$ |
| second electrically insulating undoped diamond layer | F | 2000 | 42 | 650 | 9 | 35 | 8 | 32.4 | $2.1 \times 10^{-6}$ |
| | G | 1500 | 20 | 650 | 5 | 10 | 3 | 138.7 | $9.2 \times 10^{-9}$ |
| | H | 1500 | 25 | 700 | 9 | 15 | 5 | 118.6 | $1.4 \times 10^{-8}$ |

PROCESS CONDITIONS FOR DEPOSITION OF UNDOPED DIAMOND LAYERS

FIG. 9

| manufacturing example | layers used |
|---|---|
| 1 | AD |
| 2 | AE |
| 3 | AF |
| 4 | AG |
| 5 | AH |
| 6 | BD |
| 7 | BE |
| 8 | BF |
| 9 | BG |
| 10 | BH |
| 11 | CD |
| 12 | CE |
| 13 | CF |
| 14 | CG |
| 15 | CH |

LAYER SEQUENCES

FIG. 10

| manufacturing examples 31-479 | | $H_2$ mass flow (sccm) | $CH_4$ mass flow (sccm) | coating temp. (°C) | pressure (hPa) | coating time (hours) | coating thickness (μm) | grain size (nm) | electrical conductivity (S/cm) |
|---|---|---|---|---|---|---|---|---|---|
| add'l undoped diamond layer | — | 1500 | 22 | 650 | 5 | 4 | 1 | 113.4 | $3.3 \times 10^{-8}$ |
| first electrically conductive undoped diamond layer | A | 1500 | 105 | 700 | 5 | 17 | 1 | 5.3 | 10.13 |
| | B | 2000 | 92 | 700 | 9 | 19 | 1 | 5.9 | 10.01 |
| | C | 1500 | 100 | 750 | 3 | 15 | 1 | 4.8 | 11.78 |
| second electrically insulating undoped diamond layer | D | 1500 | 44 | 650 | 5 | 40 | 8 | 20.7 | $5.4 \times 10^{-6}$ |
| | E | 1500 | 45 | 700 | 3 | 32 | 8 | 15.1 | $9.8 \times 10^{-6}$ |
| | F | 2000 | 42 | 650 | 9 | 35 | 8 | 32.4 | $2.1 \times 10^{-6}$ |
| | G | 1500 | 20 | 650 | 5 | 10 | 3 | 138.7 | $9.2 \times 10^{-9}$ |
| | H | 1500 | 25 | 700 | 9 | 15 | 5 | 118.6 | $1.4 \times 10^{-8}$ |
| third electrically conductive undoped diamond layer | A | 1500 | 105 | 700 | 5 | 17 | 1 | 5.3 | 10.13 |
| | B | 2000 | 92 | 700 | 9 | 19 | 1 | 5.9 | 10.01 |
| | C | 1500 | 100 | 750 | 3 | 15 | 1 | 4.8 | 11.78 |
| fourth electrically insulating undoped diamond layer | D | 1500 | 44 | 650 | 5 | 40 | 8 | 20.7 | $5.4 \times 10^{-6}$ |
| | E | 1500 | 45 | 700 | 3 | 32 | 8 | 15.1 | $9.8 \times 10^{-6}$ |
| | F | 2000 | 42 | 650 | 9 | 35 | 8 | 32.4 | $2.1 \times 10^{-6}$ |
| | G | 1500 | 20 | 650 | 5 | 10 | 3 | 138.7 | $9.2 \times 10^{-9}$ |
| | H | 1500 | 25 | 700 | 9 | 15 | 5 | 118.6 | $1.4 \times 10^{-8}$ |

PROCESS CONDITIONS FOR DEPOSITION OF UNDOPED DIAMOND LAYERS

FIG. 11

| manufacturing example | layers used | manufacturing example | layers used | manufacturing example | layers used | manufacturing example | layers used | manufacturing example | layers used |
|---|---|---|---|---|---|---|---|---|---|
| 31 | ADAD | 76 | AGAD | 121 | BEAD | 166 | BHAD | 211 | CFAD |
| 32 | ADAE | 77 | AGAE | 122 | BEAE | 167 | BHAE | 212 | CFAE |
| 33 | ADAF | 78 | AGAF | 123 | BEAF | 168 | BHAF | 213 | CFAF |
| 34 | ADAG | 79 | AGAG | 124 | BEAG | 169 | BHAG | 214 | CFAG |
| 35 | ADAH | 80 | AGAH | 125 | BEAH | 170 | BHAH | 215 | CFAH |
| 36 | ADBD | 81 | AGBD | 126 | BEBD | 171 | BHBD | 216 | CFBD |
| 37 | ADBE | 82 | AGBE | 127 | BEBE | 172 | BHBE | 217 | CFBE |
| 38 | ADBF | 83 | AGBF | 128 | BEBF | 173 | BHBF | 218 | CFBF |
| 39 | ADBG | 84 | AGBG | 129 | BEBG | 174 | BHBG | 219 | CFBG |
| 40 | ADBH | 85 | AGBH | 130 | BEBH | 175 | BHBH | 220 | CFBH |
| 41 | ADCD | 86 | AGCD | 131 | BECD | 176 | BHCD | 221 | CFCD |
| 42 | ADCE | 87 | AGCE | 132 | BECE | 177 | BHCE | 222 | CFCE |
| 43 | ADCF | 88 | AGCF | 133 | BECF | 178 | BHCF | 223 | CFCF |
| 44 | ADCG | 89 | AGCG | 134 | BECG | 179 | BHCG | 224 | CFCG |
| 45 | ADCH | 90 | AGCH | 135 | BECH | 180 | BHCH | 225 | CFCH |
| 46 | AEAD | 91 | AHAD | 136 | BFAD | 181 | CDAD | 226 | CGAD |
| 47 | AEAE | 92 | AHAE | 137 | BFAE | 182 | CDAE | 227 | CGAE |
| 48 | AEAF | 93 | AHAF | 138 | BFAF | 183 | CDAF | 228 | CGAF |
| 49 | AEAG | 94 | AHAG | 139 | BFAG | 184 | CDAG | 229 | CGAG |
| 50 | AEAH | 95 | AHAH | 140 | BFAH | 185 | CDAH | 230 | CGAH |
| 51 | AEBD | 96 | AHBD | 141 | BFBD | 186 | CDBD | 231 | CGBD |
| 52 | AEBE | 97 | AHBE | 142 | BFBE | 187 | CDBE | 232 | CGBE |
| 53 | AEBF | 98 | AHBF | 143 | BFBF | 188 | CDBF | 233 | CGBF |
| 54 | AEBG | 99 | AHBG | 144 | BFBG | 189 | CDBG | 234 | CGBG |
| 55 | AEBH | 100 | AHBH | 145 | BFBH | 190 | CDBH | 235 | CGBH |
| 56 | AECD | 101 | AHCD | 146 | BFCD | 191 | CDCD | 236 | CGCD |
| 57 | AECE | 102 | AHCE | 147 | BFCE | 192 | CDCE | 237 | CGCE |
| 58 | AECF | 103 | AHCF | 148 | BFCF | 193 | CDCF | 238 | CGCF |
| 59 | AECG | 104 | AHCG | 149 | BFCG | 194 | CDCG | 239 | CGCG |
| 60 | AECH | 105 | AHCH | 150 | BFCH | 195 | CDCH | 240 | CGCH |
| 61 | AFAD | 106 | BDAD | 151 | BGAD | 196 | CEAD | 241 | CHAD |
| 62 | AFAE | 107 | BDAE | 152 | BGAE | 197 | CEAE | 242 | CHAE |
| 63 | AFAF | 108 | BDAF | 153 | BGAF | 198 | CEAF | 243 | CHAF |
| 64 | AFAG | 109 | BDAG | 154 | BGAG | 199 | CEAG | 244 | CHAG |
| 65 | AFAH | 110 | BDAH | 155 | BGAH | 200 | CEAH | 245 | CHAH |
| 66 | AFBD | 111 | BDBD | 156 | BGBD | 201 | CEBD | 246 | CHBD |
| 67 | AFBE | 112 | BDBE | 157 | BGBE | 202 | CEBE | 247 | CHBE |
| 68 | AFBF | 113 | BDBF | 158 | BGBF | 203 | CEBF | 248 | CHBF |
| 69 | AFBG | 114 | BDBG | 159 | BGBG | 204 | CEBG | 249 | CHBG |
| 70 | AFBH | 115 | BDBH | 160 | BGBH | 205 | CEBH | 250 | CHBH |
| 71 | AFCD | 116 | BDCD | 161 | BGCD | 206 | CECD | 251 | CHCD |
| 72 | AFCE | 117 | BDCE | 162 | BGCE | 207 | CECE | 252 | CHCE |
| 73 | AFCF | 118 | BDCF | 163 | BGCF | 208 | CECF | 253 | CHCF |
| 74 | AFCG | 119 | BDCG | 164 | BGCG | 209 | CECG | 254 | CHCG |
| 75 | AFCH | 120 | BDCH | 165 | BGCH | 210 | CECH | 255 | CHCH |

LAYER SEQUENCES

FIG. 12

TOOL WITH WEAR DETECTION

CROSS REFERENCE TO RELATED APPLICATION

This application is based on and hereby claims the benefit under 35 U.S.C. § 119 from European Patent Application No. EP21214441.4, filed on Dec. 14, 2021, in the European Property Office. This application is a continuation-in-part of European Patent Application No. EP21214441.4, the contents of which are incorporated herein by reference.

TECHNICAL FIELD

The present invention relates to a tool body made of metal, a metal-ceramic composite or ceramics with a wear protection coating system formed in multiple layers on a functional surface subject to wear, and to a method of manufacturing the tool body.

BACKGROUND

Industrially used equipment must meet a wide range of requirements due to the numerous application possibilities. Particularly in the case of tools, the wear occurring on their tribologically stressed functional surfaces, for example when machining highly abrasive materials, and strategies for reducing or detecting the wear play an increasingly important role in the state of the art.

Against this background, the coating with diamond of functional surfaces, which must withstand high wear stress during the machining of abrasive materials, has proven to increase wear resistance. In this context, strategies for wear detection of functional surfaces have also been described.

Patent specification EP 0596619 A1 discloses an apparatus with a layer system consisting of a first diamond layer doped with boron and a second undoped diamond layer on top. The doping with boron imparts electrical conductivity to the otherwise non-conductive first diamond layer by incorporating it into the diamond crystal lattice, whereas the second diamond layer is undoped and serves purely as an anti-wear layer. Consequently, due to the doping, the first and second diamond layers also differ in their physically measurable parameters, and in particular with respect to their electrical parameters such as conductivity. Furthermore, the coating of a transparent paper guiding device, which is used in paper manufacturing, with a layer system comprising a first diamond layer and a second diamond layer, which differ in their optical properties, and a wear detection based on the transparency of the paper guiding device as well as the difference in the optical properties of both diamond layers is disclosed.

The patent specification WO 2018/166941 A1 discloses the use of a first diamond layer of polycrystalline diamonds doped with foreign atoms, which is arranged on a metal surface of a cutting tool, for detecting the degree of wear of an undoped polycrystalline second diamond layer, which is arranged on the doped diamond layer and which forms a functional area of the cutting tool. The electrical conductivity of the otherwise non-conductive first diamond layer results from the doping with boron, whereas the second diamond layer is undoped and serves purely as a wear protection layer. The difference in electrical conductivity due to the doping enables wear detection of the tool based on a change in a corresponding electrical measurement parameter in the event of advanced wear of the second undoped diamond layer due to machining of a workpiece and the resulting contact of the first doped diamond layer with the workpiece.

It is thus evident from the prior art that diamond coatings have proven their worth in increasing wear resistance, in particular in connection with tools for machining highly abrasive materials. However, use of diamond coatings in the context of wear detection, for example, during the machining of a workpiece, is still limited to the application of doped diamond coatings, especially in connection with detection via electrical measurement parameters because this is currently the only way to produce electrically conductive diamond coatings. The production of diamond coatings is often accomplished using chemical vapor deposition (CVD) and requires the use of a doping gas, whereby n-conductive or p-conductive diamond layers are produced depending on the gas used. Among other things, this leads to increased costs and additional complexity with regard to equipment and process engineering aspects, for example, due to the need for further steps such as the supply of an appropriate doping gas during the manufacturing process of the individual layers. In addition, the doping process alters the original chemical and physical properties of the diamond coatings, which can result in a reduction in wear resistance, for example.

Based on WO 2018/166941 A1, it is an object of the present invention to provide a coated body made of metal, a metal-ceramic composite or ceramic, that can be produced in a simpler and more cost-effective manner in terms of process technology and has a wear protection coating system formed in multiple layers on a functional surface of the tool body that is subject to wear, and also to provide a process for producing such a coated body.

SUMMARY

A coated tool, such as a rotating, cutting tool, includes a tool body and a multilayer wear protection coating system. The wear protection system coats a functional surface of the tool body that is subject to wear and includes a first undoped diamond layer and a second undoped diamond layer disposed over the first undoped diamond layer. The first undoped diamond layer is electrically conductive and exhibits grain boundary conductivity from delocalized electrons. The second undoped diamond layer is electrically insulating. The first undoped diamond layer has a thickness ranging from 4 20 microns and is made with diamond grains whose size ranges from 4-10 nm. The first and second diamond layers are applied by chemical vapor deposition (CVD) using a hot-wire method. The wear protection system also includes an additional undoped diamond layer that is electrically insulating and is disposed between the functional surface of the tool body and the first undoped diamond layer. The tool body is comprised of hard material particles embedded in a binder matrix, wherein the hard material particles include a substance selected from the group consisting of: a carbide, a nitride, a boride, an oxide and a silicide, and wherein the binder matrix includes cobalt or nickel A method of manufacturing a coated tool involves depositing undoped diamond layers over a tool body. A first undoped diamond layer is applied over a functional surface of the tool body. In one embodiment, the tool body is ceramic. In other embodiments, the tool body is made of hard material particles that include a carbide, a nitride, a boride, an oxide or a silicide of a metal of group IV, V or VI of the periodic table of elements. The first undoped diamond layer is applied using chemical vapor deposition (CVD) from an atmosphere of methane and hydrogen in a CVD chamber. The hydrogen is admixed with the methane in molar excess of the methane. As the first undoped diamond layer is applied, a mass flow rate of the methane is maintained in a range of 75-105 standard cubic centimeters per minute (sccm). The first undoped diamond layer is electrically conductive and exhibits grain boundary conductivity from delocalized electrons. A second undoped diamond layer is applied over the first undoped diamond layer. The second undoped diamond layer is electrically insulating. The chemical vapor deposition (CVD) is performed using a hot-wire method, and a wire made of tungsten is used in the hot-wire method. A temperature between 650° C. and 1100° C. is maintained in the CVD chamber during the chemical vapor deposition (CVD). A pressure is maintained in the CVD chamber during the chemical vapor deposition (CVD) between 1 mbar and 10 mbar.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a table listing process conditions for the deposition of a first electrically conductive undoped diamond layer, a second electrically insulating undoped diamond layer, and an additional undoped diamond layer.

FIG. 10 is a table listing the sequences of diamond layers of fifteen manufacturing examples.

FIG. 11 is a table listing process conditions for the deposition of first, second, third, fourth undoped diamond layers and an additional undoped diamond layer.

FIG. 12 is a table listing the sequences of diamond layers of 225 manufacturing examples.

DETAILED DESCRIPTION

Figure 1:
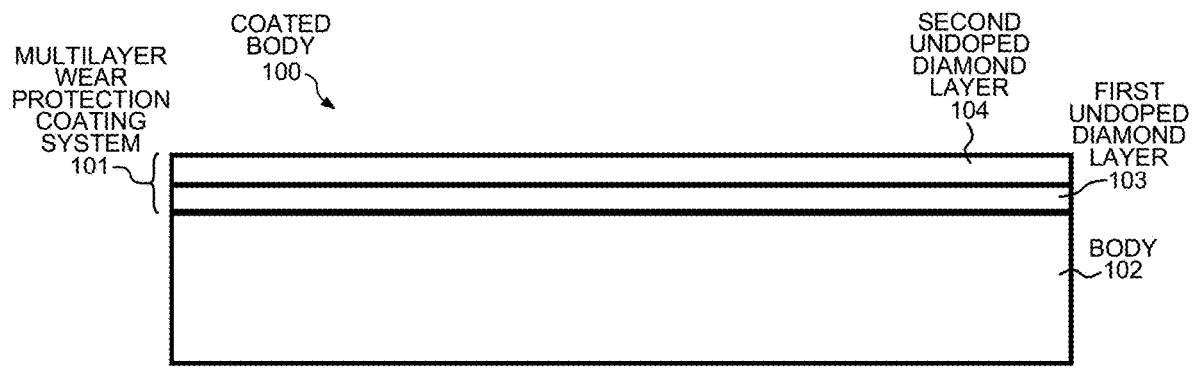
FIG. 1 is a schematic, cross-sectional side view of a coated body with a multilayer wear protection coating system according to a first embodiment.

The present invention relates to a coated body made of metal, a metal-ceramic composite or ceramics with a wear protection coating system formed in multiple layers on a functional surface of the body subject to wear. The wear protection coating system includes at least a first electrically conductive undoped diamond layer and a second electrically insulating undoped diamond layer arranged over the first undoped diamond layer. The first electrically conductive undoped diamond layer is n-type conductive and exhibits grain boundary conductivity from delocalized electrons.

The modification of diamond coatings by means of doping to increase their electrical conductivity and the subsequent use for wear detection of tribologically stressed surfaces is known. However, from a process engineering point of view, doping has the disadvantage that the use of an associated doping gas is necessary, which involves additional equipment of the coating plant, for example by means of additional gas lines, gas containers, etc. Moreover, the incorporation of impurity atoms into the diamond lattice alters not only the desired modification of the electrical conductivity but also other chemical and physical properties of the diamond coatings that may adversely affect the wear resistance. This gives rise to the finding of the present teachings, namely, that electrical conductivity of diamond coatings cannot be produced only by introducing impurity atoms into the diamond crystal lattice of the diamond grains per se, as in the case of doping, but that electrical conductivity can be produced in the grain boundary volume, that is, between the diamond grains, by forming the corresponding electrically conductive diamond coating having a nanocrystalline structure. The formation as a nanocrystalline structure allows the coexistence of $sp^2$-hybridized and spa-hybridized carbon, which imparts n-type conductivity to the diamond layer. This finding makes it possible to produce bodies with conductive diamond layers, and doing so without doping. Consequently, from a process engineering perspective, the use of doping gas and complex apparatus equipment is unnecessary. A coating system constructed in accordance with the present teachings as wear protection on a tribologically stressed functional surface of a tool body enables the degree of wear or the wear of the coated body (actually of the wear protection coating system on the tool body) to be continuously detected during operation. This makes it possible to stop using the tool associated with the tool body at an early stage so as to avoid the destruction of the tool and/or of the workpiece being machined. The detection of the wear or degree of wear of the wear protection coating system can be carried out, for example, according to the example of WO 2018/166941 A1, during operation by continuously or periodically detecting an electrical measurement parameter, such as the electrical resistance and/or the electrical conductivity and/or the capacitive resistance and/or the Hall voltage or the Hall current of a Hall sensor and/or the change thereof in the course of machining a workpiece using a tool body with a wear protection coating system that has an electrically conductive undoped diamond layer. Alternatively, a multilayer structure of the wear protection coating system that includes at least two electrically conductive undoped diamond layers enables the continuous detection of the wear or degree of wear of the coated body or of the wear protection coating system during machining of the workpiece during operation by continuously or periodically detecting the above-mentioned electrical measurement parameter or the change thereof, for example, in the simplest case in a measurement chain comprising two undoped electrically conductive diamond layers. In other words, the above-mentioned electrical measurement parameter or its change between the two undoped electrically conductive diamond layers can be recorded continuously or periodically.

FIG. 1 schematically illustrates a coated body 100 according to the invention comprised of a multilayer wear protection coating system 101 disposed over a body 102. In addition to the process engineering advantages mentioned, the coated body 100 according to the invention has the usual advantages of excellent wear resistance for a diamond coating. This is advantageous, for example, particularly when the body is a cutting or non-cutting tool because the service life of the tool can be increased by such a coating.

The grain size of the diamond grains in the first undoped diamond layer 103 of the coating system 101 should be in a range from 4 nm to 10 nm, preferably in a range from 5 nm to 6 nm, and particularly preferably in a range around 5 nm. The nanocrystalline structuring with the relevant grain size can increase the electrical conductivity of the first undoped diamond layer 103, and thus improve the wear detection via electrical measurement parameters.

The layer thickness of the first undoped diamond layer 103 should be in the range of 4 µm to 20 µm, preferably 6 µm to 8 µm, and the layer thickness of the second undoped diamond layer may be in the range of 4 µm to 20 µm, preferably 6 µm to 8 µm. A greater layer thickness of the second undoped diamond layer 104 can enable an improved wear protection coating because the body, for example, as a cutting or non-cutting tool, can withstand a longer tribological, for example abrasive, stress, and in this way the service life can be additionally increased.

The first and second diamond layers may be deposited by chemical vapor deposition (CVD), preferably using hot-wire processes. By using CVD, and in particular hot-wire processes, the two undoped layers can be applied to the body in a simple and straightforward manner.

The tool body 102 may contain hard material particles based on carbide and/or nitride and/or boride and/or oxide and/or silicide and/or phosphide embedded in a cobalt-containing and/or nickel-containing binder matrix. The hard material particles are selected from the group consisting of compounds of carbide and/or nitride and/or boride and/or oxide and/or silicide and/or phosphide of metals of subgroups IV, V and VI of the periodic table of elements, boron, aluminum, silicon either in pure form or in mixed phases, in particular titanium carbide, titanium nitride, titanium carbonitride, tungsten carbide, vanadium carbide, niobium carbide, tantalum carbide, chromium carbide, molybdenum carbide, $(W, Co)_6C$, titanium diboride, zirconium diboride, hafnium diboride, silicon nitride, titanium aluminum nitride, aluminum oxide, zirconium oxide, chromium oxide, and $MgAl_2O_4$ spinel. Carbides of the aforementioned elements can impart excellent hardness to the tool body. This is particularly advantageous when the body is a cutting or non-cutting tool, as this can have a particularly positive effect on wear resistance as well as on tool life.

The multilayer wear protection coating system 101 may have an additional undoped diamond layer 307 arranged under the first undoped diamond layer 103, which preferably corresponds in composition to the second undoped diamond layer 104. The additional undoped diamond layer 307 can additionally improve the adhesion of the first undoped diamond layer 103 to the surface of the body 102, in particular in the case of a tool made of hard metal.

The multilayer wear protection coating system 101 may include a third undoped diamond layer 505 disposed over the second undoped diamond layer 104 and a fourth undoped diamond layer 506 disposed over the third undoped diamond layer 505. The third diamond layer preferably has the same composition as the first diamond layer, and the fourth diamond layer preferably has the same composition as the second diamond layer. Consequently, the third and/or the fourth undoped diamond layer may be a layer of polycrystalline diamond, which is also referred to as a polycrystalline diamond layer in the present application. By introducing further layers such as the third and fourth diamond layers, the strength and hardness of the wear protection coating system 101 and consequently wear resistance of the tool body can be further increased. The tool life can thereby be increased, provided that the body is a cutting or non-cutting tool. In addition, this can enable continuous detection of the degree of wear of the wear protection coating system 101 or of the tool body (of the cutting or non-cutting tool).

The body 102 may in particular be a cutting or non-cutting tool. This may optionally be a tool 200 designed as a rotating or stationary tool, in particular a tool designed as a drilling, milling, countersinking, turning, threading, contouring or reaming tool. A cutting or non-cutting tool made of metal, a metal-ceramic composite or ceramics with a wear protection coating system formed in multiple layers on a functional surface of the tool subject to wear can have excellent wear resistance when machining highly abrasive materials.

Furthermore, the present invention relates to a method of manufacturing a tool body 202 according to one of the embodiments described herein. The method involves applying a multilayer wear protection coating system 101 to a wear-stressed functional surface of the body 102 by means of chemical vapor deposition (CVD) from a methane and hydrogen atmosphere in a CVD chamber. Preferably, hydrogen is admixed to the methane in molar excess, and a coating temperature of 650° C. to 1100° C., preferably 650° C. to 750° C., and a coating pressure of 1 mbar to 10 mbar or 1 hPa to 10 hPa is used. Furthermore, a hot-wire method may be used as the CVD process, in which a tungsten (W) wire is preferably used as the heating wire. Due to the absence of a doping gas in the novel manufacturing method, the process is simpler and more cost-effective from the point of view of process technology and equipment compared to conventional CVD processes that are used for depositing electrically conductive diamond coatings. In addition, novel manufacturing method ensures the production of a tool whose wear can be detected on the basis of an electrical measurement parameter without the need for doping.

FIG. 1 is a schematic, cross-sectional side view showing a coated body 100 with a multilayer wear protection coating system 101 formed on a body 102, according to a first embodiment. The body 102 has a multilayer wear protection coating system 101 formed thereon. In other words, the body 102 carries the multilayer-formed wear protection coating system 101. The multilayer wear protection coating system 101 can be disposed directly on the surface of the body 102.

The multilayer wear protection coating system 101 includes at least a first undoped diamond layer 103 and a second undoped diamond layer 104. The second undoped diamond layer 104 is arranged over the first undoped diamond layer 103. Consequently, in the wear protection coating system 101 according to the first embodiment, due to such a layer arrangement, as seen from the stacking direction, the second undoped diamond layer 104 is located at the most distant position in the wear protection coating system 101 from the body 102. In other words, in the wear protection coating system 101 according to the first embodiment, due to such a layer arrangement, the second undoped diamond layer 104 is in direct contact with the workpiece during use of the body, for example, when the body is a cutting tool, during a cutting operation on the workpiece. Such an arrangement also enables the first undoped diamond layer 103 to be used to detect the wear or degree of wear of the second undoped diamond layer 104 based on the characteristics of the first and second undoped diamond layers elaborated below.

Neither the first 103 nor the second diamond layer 104 is doped. The term "doping" and methods therefor are known to those skilled in the art. Generally, doping means the selective introduction of impurities in the form of foreign atoms into a layer or a base material, such as in the present application into a diamond crystal lattice. This process can be carried out, for example, already during the coating step by mixing a doping gas into the coating gas, or subsequently by means of ion implantation of an already produced layer. Due to the choice of the appropriately introduced impurity atoms, an n-type or p-type doping is present. Such doping processes are already used in the prior art for modifying diamond coatings in order to change their chemical or physical properties. Diamond is known to exhibit a cubic crystal system as a modification of carbon due to the spa hybridization of the 2s/2p carbon atomic orbitals. Practically, diamond films act as insulators when undoped and do not exhibit significant electrical conductivity. By doping, as described for example in WO 2018/166941 A1, the electrical conductivity of the diamond layer can be increased by selectively incorporating boron atoms into the crystal system. However, the first 103 and second 104 diamond layers in the multilayer wear protection coating system 101 according to the first embodiment are not doped. Consequently, it is not necessary to use a doping gas during the generation or application of the individual diamond layers 103, 104, for example by means of a hot-wire method, which results in a simpler and more cost-effectively manufactured coated body 100. Moreover, the absence of weakening of the crystal lattice of the diamond layers 103, 104 due to the incorporation of impurity atoms by doping results in a diamond layer 103, 104 having improved hardness and strength, and consequently wear resistance.

The first undoped diamond layer 103 and the second undoped diamond layer 104 differ with respect to their electrical conductivity. Thus, the first undoped diamond layer 103 is an electrically conductive diamond layer, whereas the second undoped diamond layer 104 is an electrically insulating diamond layer. The electrical conductivity of the second undoped diamond layer 104 should be in a range between $9.8 \times 10^{-6}$ S/cm and $9.2 \times 10^{-9}$ S/cm. The electrical conductivity of the first undoped diamond layer 103 should be in a range between 10 S/cm and 12 S/cm.

Doping is used in the prior art to modify chemical or physical properties, particularly electrical conductivity, of diamond coatings. However, in the present invention, neither the first 103 nor the second 104 diamond layer is doped. The difference between the first undoped diamond layer 103 and the second undoped diamond layer 104 with respect to their electrical conductivity is caused by the structure and composition of the first undoped diamond layer 103 compared to the second undoped diamond layer 104. The first undoped diamond layer 103 has a nanocrystalline structure. This means that diamond grains with a grain size in the nanometer range are included in the first undoped diamond layer 103. These diamond grains with a grain size in the nanometer range should have a grain size in a range from 4 nm to 10 nm, preferably in a range from 5 nm to 6 nm, and particularly preferably in a range around 5 nm. In other words, the first undoped diamond layer 103 has a nanocrystalline structure, preferably wherein the grain size of the diamond grains is in a range from 4 nm to 10 nm, more preferably in a range from 5 nm to 6 nm, and particularly preferably in a range around 5 nm. These diamond grains with a grain size in the nanometer range have a crystal structure that is usual for diamond, which corresponds to a cubic crystal structure due to the spa hybridization of the 2s/2p carbon atomic orbitals.

In addition to the diamond grains having a grain size in the nanometer range and an spa-hybridized carbon atomic orbital structure, the first undoped diamond layer 103 also contains graphene or graphite at grain boundaries of the diamond grains having a grain size in the nanometer range and bonds based on a spa-hybridized carbon atomic orbital structure. In other words, the graphene or graphite included in the first undoped diamond layer 103 is disposed between the diamond grains having a grain size in the nanometer range and whose bonds are based on an spa-hybridized carbon atomic orbital structure.

As a modification of carbon, graphene or graphite is known to exhibit a hexagonal or trigonal crystal structure due to the $sp^2$ hybridization of the 2s/2p carbon atomic orbitals. Characteristically, graphene or graphite exists as a planar system of covalently bonded hexagonal carbon rings and π-bonds perpendicular to the σ-bond plane. The electrical conductivity along the planar system is enabled by the delocalized π-electrons. In this context, the first undoped diamond layer 103 may be referred to as being n-type conductive. This means that the electrical conductivity (similar to that which results from the incorporation of, for example, phosphorus atoms into the diamond crystal lattice during doping) is caused by an electron donor, in the case of the present invention by the delocalized π-electrons of the graphite or graphene. However, compared to the electrical conductivity caused in the prior art by doping the diamond crystal lattice per se, the fundamental difference in the present invention is that the electrical conduction occurs at the grain boundaries and thus can be referred to as grain boundary (electrical) conductivity. By arranging graphene or graphite with an $sp^2$-hybridization of the 2s/2p carbon atomic orbitals in the first undoped diamond layer 103 between the diamond grains having a grain size in the nanometer range and bonds based on an $sp^3$-hybridized carbon atomic orbital structure, the electrical conductivity of the first undoped diamond layer 103 is thus significantly increased.

The difference between the first undoped diamond layer 103 and the second undoped diamond layer 104 with respect to their electrical conductivity may also result in a difference with respect to a defined electrical measurement parameter of the two layers. The electrical measurement parameter can be the electrical resistance and/or the electrical conductivity and/or the capacitive resistance and/or the Hall voltage or Hall current of a Hall sensor.

The first 103 and/or the second 104 undoped diamond layer may be a layer of polycrystalline diamond, which is also referred to as polycrystalline diamond layer in the present application. The layer thickness of the first undoped diamond layer 103 should be in the range of 4 to 20 μm, preferably 6 to 8 μm, and the layer thickness of the second undoped diamond layer 104 should be in the range of 4 to 20 μm, preferably 6 to 8 μm. By increasing the layer thickness of the second undoped diamond layer 104, an improvement in the wear protection layer can be achieved so that the coated body 100 can withstand longer lasting tribological, for example abrasive, stress when used in the machining of a workpiece.

The first 103 and second 104 undoped diamond layers may be diamond layers produced or deposited by chemical vapor deposition (CVD). Chemical vapor deposition processes are already known to the skilled person from the prior art. The most common processes include hot filament CVD or HF-CVD, microwave plasma CVD (MWP-CVD), and plasma jet. Consequently, the first and second undoped diamond layers 103, 104 may be diamond layers produced or deposited by a hot filament process, a diamond layer produced or deposited by a microwave plasma process, or a diamond layer produced or deposited by a plasma jet process. Preferably, the first 103 and second 104 undoped diamond layers are diamond layers generated or deposited by means of a hot wire process. The above-described structure and composition of the first undoped diamond layer 103, namely an arrangement of graphene or graphite between nanocrystalline diamond grains, and the second undoped diamond layer 104 can be achieved by adjusting the CVD conditions, in particular in a hot-wire method. In the case of diamond coatings produced or deposited by means of a hot-wire process, the advantage is that, for example in comparison with the plasma process, greater flexibility is achieved at lower coating temperatures. The wires used for the hot-wire method, which may be tungsten (W) wires, can be adapted to the different geometries of the body 102 to be coated because a certain distance from the hot wires must be maintained for the layer build-up, which is typically in the range of about 5 mm to 30 mm. This can be particularly advantageous when the body is a cutting or non-cutting tool, as these can have a complex geometric structure. Depending on the type and structure of the tool, it may thus also be possible to coat undercuts and rear sides.

The body 102 is made of a metal, a metal-ceramic composite, or a ceramic. The metal-ceramic composite may include carbide-based hard material particles embedded in a cobalt-containing and/or nickel-containing binder matrix. The hard material particles may also be based on nitride and/or boride and/or oxide and/or silicide and/or phosphide. These hard material particles may be present in different volume ratios in the metal-ceramic composite material. The hard material particles can be selected from the aforementioned compounds of metals in subgroup IV, V and VI of the periodic table of the elements and also boron, aluminum and silicon, either in pure form or in mixed phases. In $M_6C$ and $M_{12}C$ phases, where M stands for the corresponding metal, metals of subgroups VII and VIII may also be present. When metallic materials are used for the body 102, these hard materials may also be alloyed in this metal. Ceramic materials may be composed of said phases in pure form or in mixture, may be silicate or may include MgO. In particular, examples of the hard materials may include titanium carbide, titanium nitride, titanium carbonitride, tungsten carbide, vanadium carbide, niobium carbide, tantalum carbide, chromium carbide, molybdenum carbide, $(W, Co)_6C$, titanium diboride, zirconium diboride, hafnium diboride, silicon nitride, titanium aluminum nitride, aluminum oxide, zirconium oxide, chromium oxide, or spinels ($MgAl_2O_4$).

The multilayer wear protection coating system 101 is disposed on a functional surface of the body 102 that is subject to wear. The functional surface subject to wear may differ depending on the type and structure of the body 102 or its requirement profile. For example, the coated body 100 may be a cutting or non-cutting tool.

Figure 2:
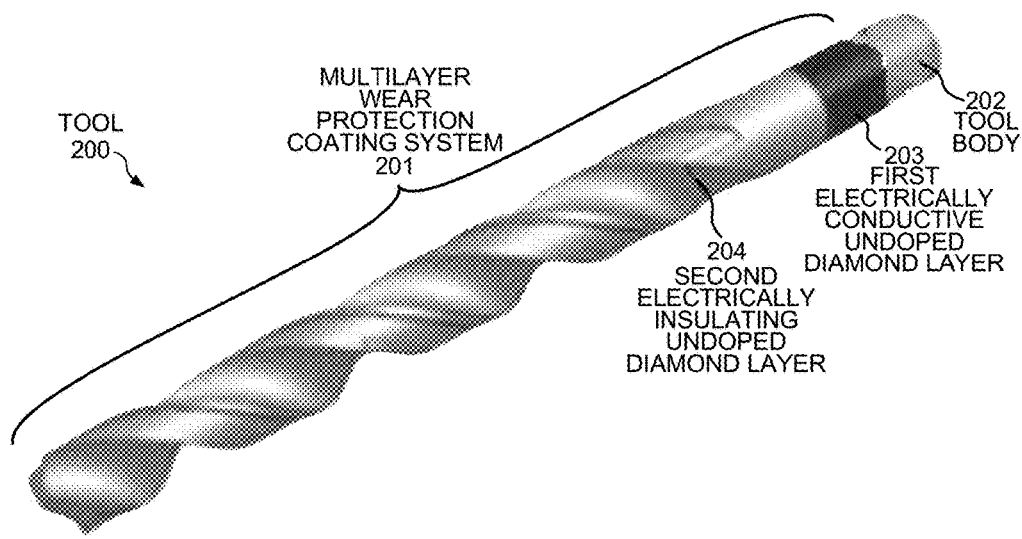
FIG. 2 a perspective view of the coated body of the first embodiment in the form of a cutting tool with a multilayer wear protection coating system.

In FIG. 2, the coated body 100 according to the first embodiment is depicted in a perspective view as a chip removing tool 200 with a multilayer wear protection coating system 201. When the coated body 100 is a chip removing or non-cutting tool, the body 102 is a tool body 202. The chip removing tool 200 of FIG. 2 has a multilayer wear protection coating system 201 formed on a functional surface of the tool body 202 that is subject to wear, the multilayer wear protection coating system 201 having a first electrically conductive undoped diamond layer 203 and a second electrically insulating undoped diamond layer 204. The first electrically conductive undoped diamond layer 203 is disposed on the tool body 202. The second electrically insulating undoped diamond layer 204 is disposed on the first electrically conductive undoped diamond layer 203. The chemical and physical properties, such as structure and composition, of the first 203 and second 204 undoped diamond layers of FIG. 2 correspond respectively to those of the first 103 and second 104 undoped diamond layers described above in connection with the coated body 100 of FIG. 1. In this regard, the first undoped diamond layer 203 of FIG. 2 corresponds to the first undoped diamond layer 103 of FIG. 1, and the second undoped diamond layer 204 of FIG. 2 corresponds to the second undoped diamond layer 104 of FIG. 1. The multilayer wear protection coating system 201 of FIG. 2 corresponds to the multilayer wear protection coating system 101 of FIG. 1.

In the case of a cutting tool, the functional surface subject to wear may in particular be the surface on a cutting part of the tool involved in the cutting operation. For example, the tool may be a rotating or stationary tool, in particular a drilling, milling, countersinking, turning, threading, contouring or reaming tool. The tool, preferably for a chip removing machining, can include a tool head, a tool shank and a clamping section for receiving into a tool holder. Accordingly, the wear-stressed functional surface of the tool, preferably for chip-removing machining, is a surface of the cutting part (tool head) that comes into contact with a workpiece during machining or a surface of the clamping section that is received in a tool receptacle. In that the functional surface subject to wear is a surface of the tool head that comes into contact with a workpiece during machining, the resistance of the tool to wear can be increased by the wear protection coating system 201. In that the functional surface subjected to wear is a surface of the clamping portion for receiving into a tool holder, the resistance of the tool to wear can be increased by the wear protection coating system 201 because the wear of the corresponding surface is reduced during repeated clamping and unclamping operations. In addition, a wear protection coating system constructed on a tribologically stressed functional surface of a body or tool allows the degree of wear or wear of the coated body 100 (i.e., actually the wear protection coating system on the body) to be detected during operation. Here, the detection of the degree of wear of the tool or the wear of the wear protection coating system is carried out, for example, according to the example of WO 2018/166941 A1. This reference describes the continuous or periodic detection of an electrical measurement parameter, in particular the electrical resistance and/or the electrical conductivity, or in particular its change in the course of the machining of a workpiece in an overall system that includes a metallic workpiece and a tool with the layer sequence of a metallic substrate layer, a doped diamond layer and an undoped diamond layer. The disclosure of WO 2018/166941 A1 is incorporated herein by reference. Thus, in the present disclosure, it is likewise possible to detect the degree of wear of the tool or the wear of the wear protection coating system by the continuous or periodic detection of an electrical measurement parameter, in particular the electrical resistance and/or the electrical conductivity and/or the capacitive resistance and/or the Hall voltage or the Hall current of a Hall sensor, or, in particular, the change thereof in the course of the machining of a workpiece in a measurement chain comprising the body or tool and the wear protection coating system, which includes the electrically conductive undoped diamond layer.

Figure 3:
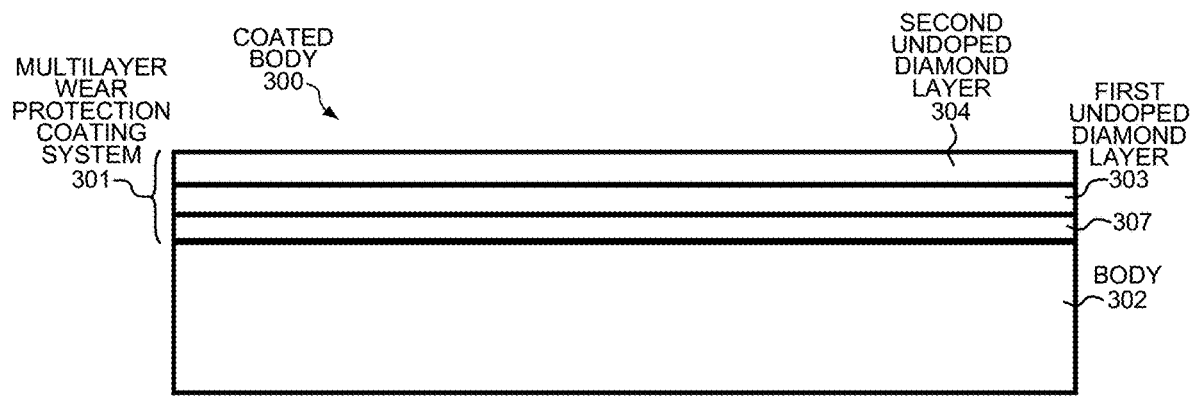
FIG. 3 is a schematic, cross-sectional side view of a coated body with a multilayer wear protection coating system according to a second embodiment.

FIG. 3 is a cross-sectional view of a coated body 300 having a multilayer wear protection coating system 301 formed thereon, according to a second embodiment. The coated body 300 of FIG. 3 has a multilayer wear protection coating system 301 formed on a functional surface of the body 302 that is subject to wear. The multilayer wear protection coating system 301 has an additional undoped diamond layer 307, a first electrically conductive undoped diamond layer 303, and a second electrically insulating undoped diamond layer 304. The first electrically conductive undoped diamond layer 303 is disposed on the additional undoped diamond layer 307. The second electrically insulating undoped diamond layer 304 is disposed on the first electrically conductive undoped diamond layer 303. The chemical and physical properties, such as structure and composition, of the first 303 and second 304 undoped diamond layers of FIG. 3 correspond respectively to those of the first 103 and second 104 undoped diamond layers described above in connection with the coated body 100 of the first embodiment of FIG. 1. Here, the first undoped diamond layer 303 of FIG. 3 corresponds to the first undoped diamond layer 103 in FIG. 1, and the second undoped diamond layer 304 of FIG. 3 corresponds to the second undoped diamond layer 104 of FIG. 1.

The coated body 300 of the second embodiment of FIG. 3 differs from the coated body 100 of the first embodiment of FIG. 1 only in that the multilayer wear protection coating system 301 includes an additional undoped diamond layer 307 under the first undoped diamond layer 303. The term "under" the first undoped diamond layer means a position between the body 302 and the first electrically conductive undoped diamond layer 303. Thus, in this embodiment, the additional undoped diamond layer 307 is disposed over the body 302, and the first electrically conductive undoped diamond layer 303 is disposed over the additional layer 307. This additional undoped diamond layer 307 corresponds in structure and composition to the second electrically insulating undoped diamond layer 304. "Corresponding in structure and composition" means, for example, that both the additional undoped diamond layer 307 and the second electrically insulating undoped diamond layer 304 have been produced by the same process under the same conditions, or that both the additional undoped diamond layer 307 and the second electrically insulating undoped diamond layer 304 have the same chemical and physical properties. This includes, for example, the thickness of the layer, the grain size in the diamond layer, the chemical composition, or an electrical measurement parameter such as electrical conductivity. By including an additional undoped diamond layer 307 between the body 302 and the first undoped diamond layer 303, the adhesion between the first undoped diamond layer 303 and the body 302 can be improved. Alternatively, the additional undoped diamond layer 307 can be a monocrystalline diamond (MCD) layer. This MCD layer can include diamond grains having a grain size corresponding to that of the hard material particles in the body 302. By having the additional undoped diamond layer 307 in the form of an MCD layer, a mechanical linkage between the body 302, in particular a hard metal body or substrate, and the first undoped diamond layer 303 can be promoted without the first layer 303 being directly bonded to the body 302. Consequently, the adhesion between the body 302 and the first undoped diamond layer 303 can be improved. This provides the advantage of improved adhesion, and consequently improved wear resistance and tool life, particularly in the context of metal cutting tools. A further advantage over direct deposition of the first undoped diamond layer 303 onto the body 302 is that increased carburization is inhibited, which would otherwise result during deposition of the first undoped diamond layer 303 due to a higher methane content in the methane and hydrogen atmosphere and which would impede the build-up of the diamond crystal lattice. This aspect also results in an optimized adhesion structure. The additional undoped diamond layer 307 may be formed as a two-layer sequence of the above-described MCD layer disposed on the body 302 and an undoped diamond layer corresponding in structure and composition to the second undoped diamond layer 304 that is disposed on the MCD layer.

Figure 4:
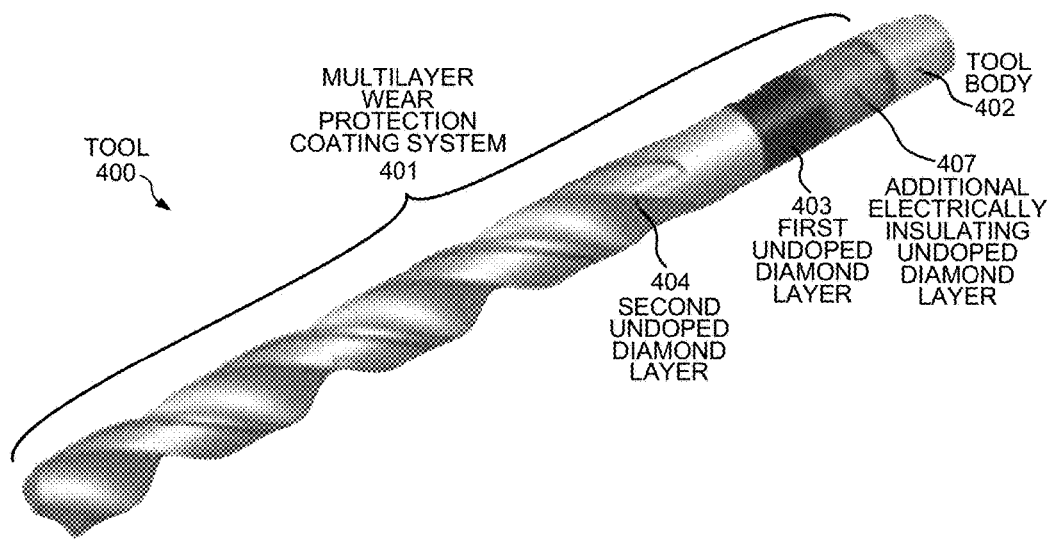
FIG. 4 a perspective view of the coated body of the second embodiment in the form of a cutting tool with a multilayer wear protection coating system.

FIG. 4 shows a perspective view of the coated body 300 of the second embodiment, which is depicted as a chip removing tool 400 with a multilayer wear protection coating system 401. When the coated body 300 is a chip removing or non-cutting tool, the body 302 is a tool body 402. The chip removing tool 400 of FIG. 4 according to the second embodiment differs from the chip removing tool 200 of FIG. 2 according to the first embodiment in that the multilayer wear protection coating system 401 in FIG. 4 has an additional undoped diamond layer 407. The chip removing tool 400 shown in FIG. 4 has a multilayer wear protection coating system 401 formed on a functional surface of the tool body 402 that is subject to wear. The multilayer wear protection coating system 401 has an additional undoped diamond layer 407, a first electrically conductive undoped diamond layer 403, and a second electrically insulating undoped diamond layer 404. The additional undoped diamond layer 407 is disposed over the tool body 402. The first electrically conductive undoped diamond layer 403 is disposed over the additional undoped diamond layer 407. The second electrically insulating undoped diamond layer 404 is disposed over the first electrically conductive undoped diamond layer 403. The chemical and physical properties, such as structure and composition, of the additional undoped diamond layer 407 and the first 403 and second 404 undoped diamond layers of the chip-removing tool 400 of FIG. 4 according to the second embodiment correspond respectively to those of the additional undoped diamond layer 307 described in connection with the coated body 300 of FIG. 3 and the first 303 and second 304 undoped diamond layers. Here, the additional undoped diamond layer 407 of FIG. 4 corresponds to the additional undoped diamond layer 307 of FIG. 3, and the first undoped diamond layer 403 of FIG. 4 corresponds to the first undoped diamond layer 303 of FIG. 3. The second undoped diamond layer 404 of FIG. 4 corresponds to the second undoped diamond layer 304 of FIG. 3, and the multi-layered wear resistant coating system 401 of FIG. 4 is similar to the multi-layered wear resistant coating system 301 of FIG. 3. The additional undoped diamond layer 307 may alternatively be an MCD layer as described above.

Figure 5:
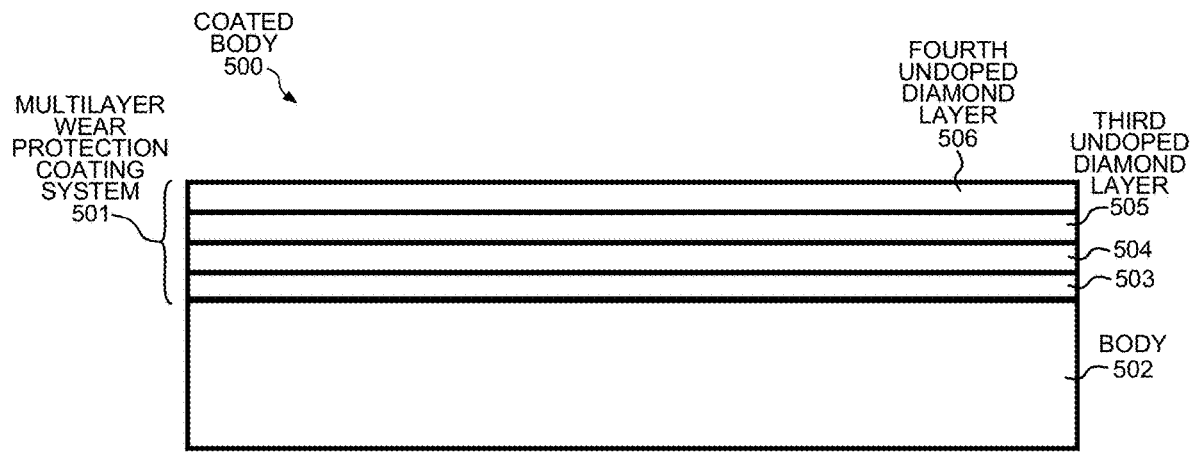
FIG. 5 is a schematic, cross-sectional side view of a coated body with a multilayer wear protection coating system according to a third embodiment.

FIG. 5 schematically shows a cross-sectional view of a coated body 500 with a multilayer wear protection coating system 501 according to a third embodiment. The coated body 500 according to the third embodiment differs from the coated body 100 according to the first embodiment only in that the multilayer wear protection coating system 501 includes a third undoped diamond layer 505 and a fourth undoped diamond layer 506. The chemical and physical properties, such as structure and composition, of the first 503 and second 504 undoped diamond layers of the coated body 500 of FIG. 5 according to the third embodiment correspond respectively to those of the coated body 100 illustrated above in connection with the coated body 100 of FIG. 1 according to the first embodiment. The first undoped diamond layer 503 of FIG. 5 corresponds to the first undoped diamond layer 103 of FIG. 1, and the second undoped diamond layer 504 of FIG. 5 corresponds to the second undoped diamond layer 104 of FIG. 1.

In the coated body 500 according to the third embodiment, the third undoped diamond layer 505 is disposed on the second undoped diamond layer 504, and the fourth undoped diamond layer 506 are disposed over the third undoped diamond layer 505. The third undoped diamond layer 505 has the same structure or composition as the first diamond layer 503. The fourth undoped diamond layer 506 has the same structure or composition as the second diamond layer 504. The term "having the same structure or composition" as applied to the third embodiment has the same meaning as explained in connection with the first embodiment. Consequently, in the wear protection coating system 501 according to the third embodiment, due to such a layer arrangement, the fourth undoped diamond layer 506 is located at the most distant position in the wear-resistant layer system 501 from the stacking direction. In other words, due to such a layer arrangement, the fourth undoped diamond layer 506 in the wear protection coating system 501 according to the third embodiment is in direct contact with the workpiece when the coated body 500 is used for machining a workpiece, for example, when the coated body 500 is a tool 600. By adding further layers such as third 505 and fourth 506 diamond layers, the strength and hardness of the wear protection coating system 501 and consequently the wear resistance of the coated body 500 is further increased. In addition, the multilayer structure of the wear protection coating system 501 that includes at least two electrically conductive undoped diamond layers enables the continuous detection of the degree of wear of the coated body 500 or of the wear protection coating system 501 during the machining of a workpiece during operation by continuously or periodically detecting an electrical measurement parameter mentioned above or the change thereof, for example, in the simplest case in a measurement chain that includes two undoped electrically conductive diamond layers.

Figure 6:
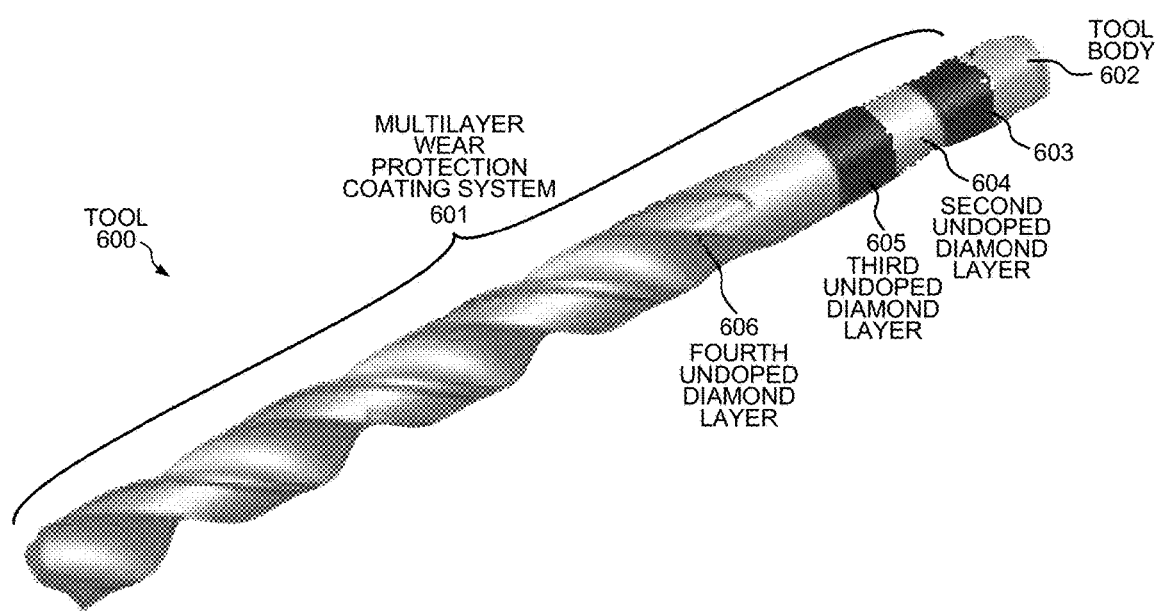
FIG. 6 a perspective view of the coated body of the third embodiment in the form of a cutting tool with a multilayer wear protection coating system.

The coated body 500 according to the third embodiment is schematically illustrated in FIG. 6 as a chip removing tool 600 with a multilayer wear protection coating system 601. When the coated body 500 is a chip removing or non-cutting tool, the body 502 is a tool body 602. The chip removing tool 600 of FIG. 6 differs from the chip removing tool 200 of FIG. 2 in that the multilayer wear protection coating system 601 of FIG. 6 additionally includes a third electrically conductive undoped diamond layer 605 and a fourth electrically insulating undoped diamond layer 606. The chip-removing tool 600 of FIG. 6 has a multilayer wear protection coating system 601 formed on a functional surface of the tool body 602 that is subject to wear. The wear protection coating system 601 has a first electrically conductive undoped diamond layer 603, a second electrically insulating undoped diamond layer 604, a third electrically conductive undoped diamond layer 605, and a fourth electrically insulating undoped diamond layer 606. The first electrically conductive undoped diamond layer 603 is disposed over the tool body 602. The second electrically insulating undoped diamond layer 604 is disposed over the first electrically conductive undoped diamond layer 603. The third electrically conductive undoped diamond layer 605 is disposed over the second electrically insulating undoped diamond layer 604. The fourth electrically insulating undoped diamond layer 606 is disposed over the third electrically conductive undoped diamond layer 605. The chemical and physical properties, such as structure and composition, of the first, second, third and fourth undoped diamond layers 603, 604, 605, 606 of the chip-removing tool 600 of FIG. 6 according to the third embodiment correspond respectively to those of the first, second, third and fourth undoped diamond layers 503, 504, 505, 506 described above in connection with the coated body 500 of FIG. 5 according to the third embodiment.

Figure 7:
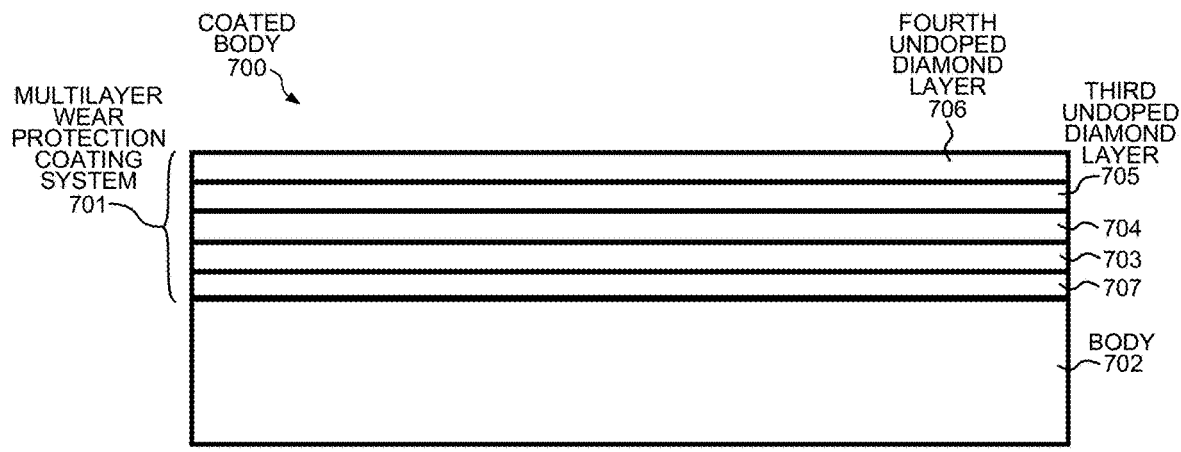
FIG. 7 is a schematic, cross-sectional side view of a coated body with a multilayer wear protection coating system according to a fourth embodiment.

FIG. 7 shows a cross-sectional side view of a coated body 700 with a multilayer wear protection coating system 701 according to a fourth embodiment. The coated body 700 according to the fourth embodiment shown in FIG. 7 differs from the coated body 300 of FIG. 3 according to the second embodiment only in that the multilayer wear protection coating system 701 additionally includes a third electrically conductive undoped diamond layer 705 and a fourth electrically insulating undoped diamond layer 706. The chemical and physical properties, such as structure and composition, of the additional undoped diamond layer 707, and the first and second undoped diamond layers 703, 704 of FIG. 7 correspond respectively to those of the additional undoped diamond layer 307, and the first and second undoped diamond layers 303, 304 of FIG. 3 described above in connection with the second embodiment. In addition, the arrangement and the chemical and physical properties, such as structure and composition, of the third electrically conductive undoped diamond layer 705 and the fourth electrically insulating undoped diamond layer 706 of FIG. 7 correspond respectively to those of the third electrically conductive undoped diamond layer 505 and the fourth electrically insulating undoped diamond layer 506 of FIG. 5 described above in connection with the third embodiment.

Figure 8:
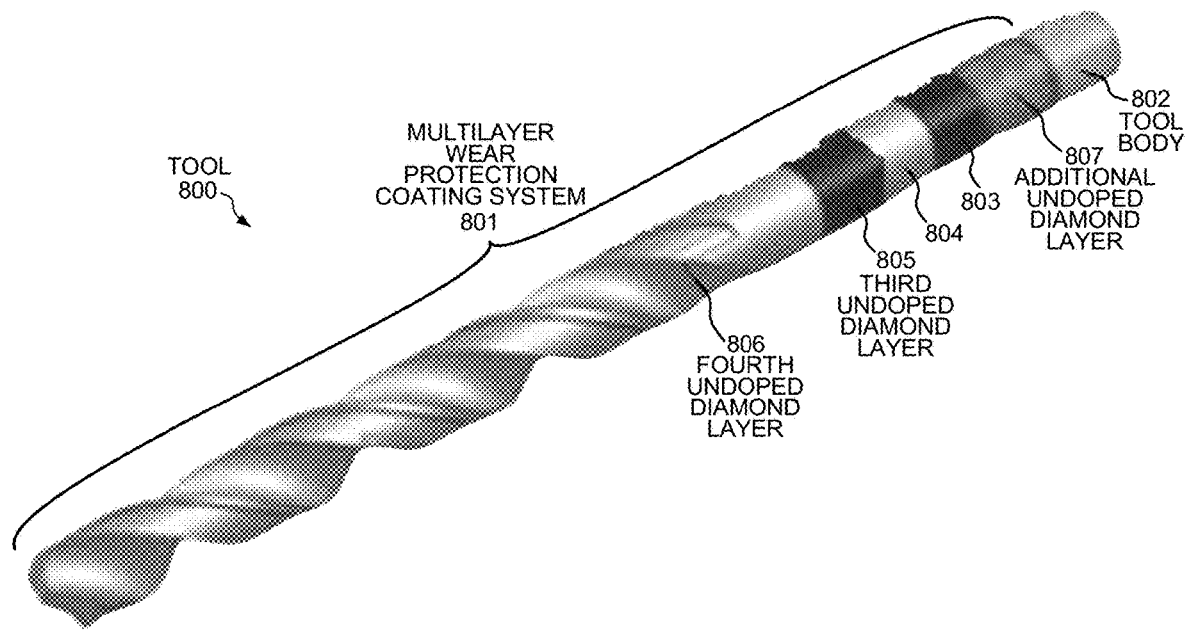
FIG. 8 a perspective view of the coated body of the fourth embodiment in the form of a cutting tool with a multilayer wear protection coating system.

The coated body 700 according to the fourth embodiment is schematically illustrated in FIG. 8 as a chip removing tool 800 with a multilayer wear protection coating system 801. When the coated body 700 is a chip-removing or chipless tool, the body 702 is a tool body 802. The chip-removing tool 800 of FIG. 8 differs from the chip-removing tool 400 of FIG. 4 according to the second embodiment only in that the multilayer wear protection coating system 801 additionally includes a third electrically conductive undoped diamond layer 805 and a fourth electrically insulating undoped diamond layer 806. The arrangement, as well as the chemical and physical properties, such as structure and composition, of the additional undoped diamond layer 807, and the first, second, third and fourth undoped diamond layers 803, 804, 805, 806 of FIG. 8 correspond respectively to those of the additional undoped diamond layer 707, and the first, second, third and fourth undoped diamond layers 703, 704, 705, 706 of FIG. 7 described above in connection with the coated body 700 according to the fourth embodiment.

The present disclosure also encompasses modifications of the first, second, third and fourth embodiments that do not depart from the essence of the invention. For example, a coated body 500, 700 with a multilayer wear protection coating system 501, 701 according to the third or fourth embodiment may include, in addition to the first, second, third and fourth undoped diamond layers 503, 504, 505, 506, 703, 704, 705, 706, at least one further pair of layers comprising two undoped diamond layers, wherein the two undoped diamond layers are different in their arrangement and structure or composition and correspond to the first and second undoped diamond layers 503, 504, 703, 704. For example, in the case of another pair of layers, a fifth undoped diamond layer could be conceivably disposed over the fourth undoped diamond layer 506, 706, and a sixth undoped diamond layer disposed over the fifth undoped diamond layer. Notwithstanding the above, if required in the first, second, third or fourth embodiments, the multilayer wear protection coating system 101, 301, 501, 701 may include one or more further layers, for example between the first and second undoped diamond layers 103, 104, 303, 304, 503, 504, 703, 704. If required, the coated body 100, 300, 500, 700 can include one or more further layers, for example under or on top of the multilayer wear protection coating system 101, 301, 501, 701, and in addition to the multilayer wear protection coating system 101, 301, 501, 701. For example, the further layer or layers of the aforementioned modifications may be diamond layers or ceramic layers, for example, as part of the pair of layers.

Furthermore, the present invention relates to a method for producing a coated body according to one of the embodiments described above. The method comprises applying a multilayer wear protection coating system to a functional surface of a body made of metal, a metal-ceramic composite or ceramics subject to wear by means of chemical vapor deposition (CVD) from a methane and hydrogen atmosphere in a CVD chamber. The application of a multilayer wear protection coating system involves applying a first electrically conductive undoped diamond layer to a functional surface that is subject to wear of a body made of metal, a metal-ceramic composite or ceramic by chemical vapor deposition (CVD) from a methane and hydrogen atmosphere in a CVD chamber. A second electrically insulating undoped diamond layer is then deposited over the first undoped diamond layer by chemical vapor deposition (CVD) from a methane and hydrogen atmosphere in the CVD chamber.

The operation of a chemical vapor deposition (CVD) process is generally known to one of skill in the art. Examples of a chemical vapor deposition (CVD) process may include hot filament CVD or HF-CVD, microwave plasma CVD (MWP-CVD), or plasma jet. The processes differ in the amount of activated species and thus in coating speed and layer quality, coatable surface and geometry as well as scalability. For example, the HF-CVD process offers the greatest flexibility at lower coating temperatures compared to the plasma process. The wires can be adapted to the different geometries of the bodies to be coated, since a certain distance to the hot wires must be maintained for the layer build-up, which is typically in the range of about 5 mm to 30 mm. In the context of the present disclosure, it is generally preferred for the application of a multilayer wear protection coating system to be carried out as a hot wire process, preferably using a tungsten (W) wire.

The deposition of the diamond layers in the multilayer wear protection coating system is carried out in a CVD chamber by means of chemical vapor deposition (CVD) from a methane and hydrogen atmosphere. The methane and hydrogen atmosphere can be generated by introducing into a vacuum chamber material gas containing the predetermined composition of the corresponding components, but at least hydrogen in molar excess to methane. Upon introduction into the chamber, the material gas is typically excited to a state containing plasma or radicals. For example, in the HF-CVD process, the material gas is heated by contact with the hot filament in such a way that hydrogen splits into hydrogen radicals which react with methane in the further course of the reaction to ultimately enable the formation of a diamond layer. The correspondingly excited material gas is used to apply the multilayer wear protection coating system or the various individual layers.

Preferably, the application of the multilayer wear protection coating system is carried out by admixing hydrogen in molar excess to methane in a CVD chamber, wherein a coating temperature of 650° C. to 750° C. and a coating pressure of 1 mbar to 10 mbar or 1 hPa to 10 hPa is used. Particularly preferably, the deposition of a first undoped diamond layer is carried out under the conditions of a higher methane composition, preferably wherein methane is contained between 5% and 7% ($CH_4$ mass flow rate of 75 sccm to 105 sccm), and higher process temperature, preferably between 700° C. and 750° C., and the deposition of a second undoped diamond layer is carried out under the condition of a lower methane composition, preferably wherein methane is contained between 1.3% and 3% ($CH_4$ mass flow rate of 20 sccm to 45 sccm). The temperature of the filaments should be in the range of 1800° C. to 2200° C., but preferably about 2000° C. The distance of the filaments from the body to be coated should be between 3 mm and 10 mm, but preferably about 5 mm. The methane and hydrogen atmosphere may be generated by supplying $H_2$/$CH_4$ as a material gas. The material gas can be adjusted by the mass flow rates used. The $H_2$ mass flow rate should be in a range of 1000 sccm and 3000 sccm. Particularly preferably, the deposition of the first undoped diamond layer is performed at a $H_2$ mass flow rate in a range of 1000 sccm to 1500 sccm, and the deposition of the second undoped diamond layer is performed at a $H_2$ mass flow rate in a range of 1500 sccm to 3000 sccm. The $CH_4$ mass flow rate should be in a range of 20 sccm to 105 sccm. This corresponds to a $CH_4$ content in the methane and hydrogen atmosphere in a range of 1.3% to 7%. It is particularly preferred for the deposition of the first undoped diamond layer to be carried out at a $CH_4$ mass flow rate in a range of 75 sccm to 105 sccm ($CH_4$ content in the methane and hydrogen atmosphere in a range of 5% to 7%), and the deposition of the second undoped diamond layer to be carried out at a $CH_4$ mass flow rate in a range of 20 sccm to 45 sccm ($CH_4$ content in the methane and hydrogen atmosphere in a range of 1.3% to 3%). In addition to or instead of methane, other carbon-containing gases suitable for CVD processes, in particular, ethane, ethylene or acetylene, may be used in the context of the aspects disclosed above. The coating duration can be varied depending on the required thickness of the individual layers. Generally, the coating duration should be from 15 hours to 30 hours. It is particularly preferred for the coating duration for applying the first undoped diamond layer to be 15 hours to 20 hours, and the coating duration for applying the second undoped diamond layer to be 15 hours to 50 hours. The coating temperature, i.e., the temperature of the body to be coated, should be between 600° C. and 1000° C., preferably between 650° C. and 750° C. It is particularly preferred for the coating temperature for depositing the first undoped diamond layer to be between 700° C. and 750° C., and the coating temperature for depositing the second undoped diamond layer to be between 650° C. and 700° C. The coating pressure in the CVD chamber should be between 1 hPa and 10 hPa. It is particularly preferred for the coating pressure for depositing the first undoped diamond layer to be between 1 hPa and 5 hPa, and the coating pressure for depositing the second undoped diamond layer to be between 5 hPa and 10 hPa. The coating rates should typically be between 0.05 μm/h and 3 μm/h for the HF-CVD process. It is particularly preferred for the coating rate for depositing the first undoped diamond layer to be between 0.05 μm/h and 0.1 µm/h, and the coating rate for depositing the second undoped diamond layer to be between 0.2 µm/h and 0.3 µm/h.

If required, prior to the application of the first undoped diamond layer, the application of an additional undoped diamond layer to a wear-stressed functional surface of the body can first be carried out by means of chemical vapor deposition (CVD) from a methane and hydrogen atmosphere in a CVD chamber. The additional undoped diamond layer corresponds to the additional undoped diamond layer disclosed above in the context of describing the multilayer wear protection coating system, and the corresponding process conditions disclosed above apply for the application. In other words, given the case that the additional undoped diamond layer is to have the same structure and composition as the second undoped diamond layer, the correspondingly above-described process conditions for the deposition are to be applied. In this case, the deposition of the first undoped diamond layer onto the additional undoped diamond layer is then carried out by means of chemical vapor deposition (CVD) from a methane and hydrogen atmosphere in a CVD chamber. Alternatively, as discussed above, the additional undoped diamond layer is an MCD layer. In this case, the deposition of the MCD layer on a wear-stressed functional surface of the body can be performed by chemical vapor deposition (CVD) from a methane and hydrogen atmosphere in a CVD chamber, wherein the methane content in the methane and hydrogen atmosphere is low, preferably between 1% and 1.5% ($CH_4$ mass flow of 15 sccm to 25 sccm). The application of this MCD layer results in the advantages listed above when describing an MCD layer, for example improved adhesion, and in the case of cutting tools, improved wear resistance and tool life. Insofar as the additional undoped diamond layer, as described above, is a two-layer sequence that includes the MCD layer described above, which is deposited over the body, and an undoped diamond layer, which corresponds in its structure and composition to the second undoped diamond layer and is arranged on the MCD layer, the process is to be supplemented by the respective steps for applying the respective layers with the corresponding process conditions described above.

If required, prior to the deposition of the second undoped diamond layer, the deposition of one or more further layers, preferably by chemical vapor deposition (CVD) from a methane and hydrogen atmosphere in a CVD chamber, may first be carried out on the first undoped diamond layer. This one or more further layers corresponds to the one or more further layers described above in the context of modifying the multilayer wear protection coating system, and the corresponding process conditions described above apply for the application.

If required, after deposition of the second undoped diamond layer, deposition of a third undoped diamond layer and a fourth undoped diamond layer may be performed by chemical vapor deposition (CVD) from a methane and hydrogen atmosphere in a CVD chamber. Preferably, the third undoped diamond layer is deposited on the second undoped diamond layer, and the fourth undoped diamond layer is deposited on the third undoped diamond layer. In this regard, the third undoped diamond layer and the fourth undoped diamond layer correspond to the third and fourth undoped diamond layers described above in the context of the multilayer wear protection coating system. Accordingly, the process conditions for deposition described above apply. In other words, given the case that the third undoped diamond layer corresponds to the first undoped diamond layer, and/or the fourth undoped diamond layer corresponds to the second undoped diamond layer, the correspondingly above-described process conditions for the application apply.

If required, the substrate surface of the body can be pre-germinated, for example, by dusting with diamond powder before the first undoped diamond layer is applied. This can be done by an ultrasonic assisted nucleation process, preferably using a 2.5% NanoAmando® solution. Here, the germination process can be performed by immersing the body in a 2.5% NanoAmando® solution, preferably for about 10 minutes. Such an ultrasound-assisted germination process can also be used for germination of the tool body if the body is a cutting or non-cutting tool.

If required, a pretreatment of the functional surface of a body to be coated can be performed prior to applying the first undoped diamond layer, for example, by etching the functional surface of the body to be coated using a Murakami solution and/or peroxomonosulfuric acid ($H_2SO_5$; Caro's Acid). A Murakami solution is typically a solution of $K_3[Fe(CN)_6]$ in KOH. Preferably, such a pretreatment is performed on a body of cemented carbide that also contains, for example, hard particles, e.g., WC grains, embedded in a cobalt-containing binder matrix. Such a pretreatment step reduces the content of cobalt in the surface region of the substrate of the body. Without being bound to the substrate surface, the catalytic effect for the reconversion of the cubic diamond phase to the hexagonal graphite phase can be reduced so that the cubic diamond crystals have sufficient time to grow on the substrate surface without in situ re-conversion to graphite. Consequently, such a pretreatment step promotes improved nucleation of the diamond grains at deposition initiation by inhibiting graphitization. A further advantage of such a pretreatment step is that it improves the adhesion of the first undoped diamond layer to the body, in particular to hard metal.

Due to the absence of doping during the deposition of at least the first and second diamond layers from a methane and hydrogen atmosphere in a CVD chamber, it is not necessary to add a doping gas to the process. Consequently, a simpler and more cost-effective production of the coated body is made possible in terms of apparatus and process technology.

By means of the above-described process conditions, and in particular with regard to the coating temperature, the coating pressure and the hydrogen/methane atmosphere, and in particular the $H_2$/$CH_4$ mass flows, a first undoped diamond layer can be produced or applied that has the nanocrystalline structure described above in the context of its properties and is n-conductive. By integrating this first undoped diamond layer in the context of a multilayer wear protection coating system, the above-described coated body with a wear protection coating system that is multilayered on a wear-stressed functional surface of the body can be produced in accordance with the first, second, third or fourth embodiments, as well as with the modifications thereof described above. The multilayer wear protection coating system exhibits the advantages of a diamond coating, such as an increase in wear resistance to abrasive stress. Moreover, wear detection by means of an electrical parameter does not rely on doping.

As mentioned above, the present invention finds particular application to a non-cutting or cutting tool, wherein the entire tool or a part of the tool, for example a cutting part, forms the tool body. The coated body according to the present invention has the advantage that the detection of the degree of wear of a tool body during the machining of a workpiece on the basis of the wear of the wear protection coating system can be efficiently and simply enabled without having to forego the advantages of a diamond coating such as, for example, the increase in wear resistance and, at the same time, not having to rely on doping of the diamond layer to detect wear, for example, by means of an electrical parameter. Particularly in connection with the use of a coated body according to the third or fourth embodiments, wear detection via a measuring chain involving both tool body and workpiece is unnecessary when machining the workpiece because wear detection can be performed exclusively within the coated body. This has the advantage that wear detection can also be applied to non-conductive workpieces. In addition, the user is enabled to work more safely during the detection.

Notwithstanding the fact that this disclosure is directed to a tool body, the present teachings can equally be applied to objects other than a tool body. For example, the above-described anti-wear coating system can equally be applied to objects or systems whose opposing surfaces are in frictional contact and are thus subject to frictional forces. In this regard, this disclosure is intended to encompass, for example, the application to plain bearings and their bearing surfaces or to brake discs in automobiles. In addition, the present disclosure extends to wear parts made of metal, a metal-ceramic composite or ceramics. In particular, cutting or non-cutting tools are intended to be included.

Manufacturing Examples of the First and Second Embodiments

A carbide twist drill made of a 10M % Co carbide with an average WC grain size of 0.6 μm (Guhring trade name DK460UF) was pretreated for coating by first performing an etching step to remove cobalt from the surface using a Murakami solution and Caro's acid. This was followed by an ultrasound-assisted nucleation process by immersion in 2.5% NanoAmando® solution for 10 minutes. The resulting pretreated body or tool body was placed in the vacuum chamber of a commercial hot-wire CVD system (CemeCon CC800/Dia). The tungsten wires (99.99% purity, Ø0.147 μm) of the CVD system were arranged parallel to each other at a distance of approximately 10 mm. The inserted body or tool body was surrounded by two filament frames parallel to the longitudinal axis of the body. The temperature of the filaments was set to approximately 2000° C. and checked by means of optical thermometers. The distance between the filaments and the body or tool body to be coated was 5 mm. Subsequently, the first electrically conductive undoped diamond layer was deposited on the surface of the body or tool body by supplying $H_2/CH_4$ as a material gas, and then the second electrically insulating undoped diamond layer was deposited over the first undoped diamond layer while changing the process conditions during operation. If necessary, an additional undoped diamond layer was deposited before the deposition of the first undoped diamond layer.

The table of FIG. 9 shows process conditions (A to I) respectively for the deposition of the first electrically conductive undoped diamond layer (process conditions A, B or C) and second electrically insulating undoped diamond layer (process conditions D, E, F, G or H), as well as the additional undoped diamond layer (process condition I). In addition, the resulting layer thickness and electrical conductivity are indicated for each case. Thus, FIG. 9 indicates the process conditions (I, A, B, C, D, E, F, G and H) for depositing the first and second undoped diamond layers and the additional undoped diamond layer. In the table of FIG. 9, "sccm" stands for standard cubic centimeters per minute. Independent of pressure and temperature, the "sccm" unit describes a defined flowing quantity of gas per unit of time, i.e., a mass flow. The standard cubic centimeter is a gas volume of V=1 $cm^3$ under standard conditions (T=0° C. and p=1013.25 hPa), the so-called physical standard conditions according to DIN 1343.

The summary of the individual process conditions A to I in the table of FIG. 9 serves only for better representability. Within the scope of the manufacture of a body or tool with a multilayer wear protection coating system according to the first embodiment, it is possible to combine the individual process conditions A to C or D to H as desired for the first undoped diamond layer and second undoped diamond layer. For this purpose, the process conditions for depositing the first undoped diamond layer and the second undoped diamond layer, respectively, in the manufacturing example described above are applied accordingly as shown in FIG. 9. In other words, for example, for manufacturing a body or a tool with a multilayer wear protection coating system according to the first embodiment, the process conditions A and F can be applied in order first to deposit a first electrically conductive undoped diamond layer on the surface of the body or tool body according to process condition A, and then to deposit a second electrically insulating undoped diamond layer according to process condition F over the first undoped diamond layer. This results, for example, in the manufacturing examples 1 to 15 listed in the table of FIG. 10 for a body or a tool with a multilayer wear protection coating system according to the first embodiment. The layers resulting from the application of the process conditions are designated in each case by the letters corresponding to the process conditions. The layer sequences for each of the manufacturing examples 1 to 15 are listed in FIG. 10.

If required, an additional undoped diamond layer can be deposited by applying the process conditions I of FIG. 9 in order to produce a coated body or tool according to the second embodiment. Because the process conditions I can be combined with the other process conditions A to C or D to H of the first or second undoped diamond layer, in addition to the manufacturing examples 1 to 15 shown in FIG. 10, further manufacturing examples 16 to 30 result that differ from the manufacturing examples 1 to 15 shown in FIG. 10 only in that an additional undoped diamond layer is deposited in the layer sequence in each case before the deposition of the first undoped diamond layer according to process conditions A, B or C, using the process conditions I. For example, for the manufacturing example 16, the layer sequence AD results in the layer sequence IAD by applying the process conditions I in the context of the manufacturing example 1.

Manufacturing Examples of the Third and Fourth Embodiments

Examples for the production of a body or a tool with a multilayer wear protection coating system according to the third embodiment were initially carried out in accordance with the general process described above for the production of a body or a tool with a multilayer wear protection coating system according to the first embodiment and differ from these only in that, after the deposition of the second electrically insulating undoped diamond layer of a tool with a multilayer wear protection coating system according to the first embodiment and differ from these only in that, in addition, after the deposition of the second electrically insulating undoped diamond layer on the first electrically conductive undoped diamond layer, a third electrically conductive undoped diamond layer was additionally deposited on the second undoped diamond layer during operation. For this purpose, the same process conditions were applied that were applied in manufacturing examples 1 to 30 in connection with the deposition of the first undoped diamond layer, in other words, the process conditions A, B or C. The second undoped diamond layer was deposited over the second undoped diamond layer during operation. Subsequently, the deposition of a fourth electrically insulating undoped diamond layer over the third undoped diamond layer was carried out during operation. For this purpose, the same process conditions were applied that were applied in manufacturing examples 1 to 30 in connection with the deposition of the second undoped diamond layer, in other words, process conditions D, E, F, G or H. The corresponding process conditions are shown, again merely, in the table of FIG. 11 for ease of presentation only. FIG. 11 indicates the process conditions (I, A, B, C, D, E, F, G and H) for depositing the first, second, third and fourth undoped diamond layers, as well as the additional undoped diamond layer.

The application of the process conditions shown in FIG. 11 results in the manufacturing examples 31 to 255 indicated in the table of FIG. 12. A body or a tool with a multilayer wear protection coating system according to the third embodiment can be manufactured with the corresponding layer sequences indicated in FIG. 12. The indicated layers result from the application of the process conditions and are each designated with the letters corresponding to those process conditions.

If necessary, an additional undoped diamond layer can be deposited by applying the process conditions I of FIG. 11 to produce a coated body or tool according to the fourth embodiment. Because the process conditions I are combined with the other process conditions A to C of the first or third undoped diamond layers, and D to H of the second or fourth undoped diamond layers, further manufacturing examples 256 to 479 result in addition to the manufacturing examples 31 to 255 shown in the table of FIG. 12, which differ from the manufacturing examples 31 to 255 of FIG. 12 only in that an additional undoped diamond layer is deposited using the process conditions I in the layer sequence in each case before the deposition of the first undoped diamond layer in accordance with process conditions A, B or C. For example, for the manufacturing example 256, the layer sequence ADAD results in the layer sequence IADAD by applying the process conditions I in the context of the manufacturing example 31.

Measuring Principles

The layer thicknesses were measured using reflectometric interference spectroscopy (RIfS). It was confirmed that the electrically conductive diamond coatings had a thickness of 1 µm to 2 µm, whereas the electrically insulating undoped diamond coatings used for wear had a thickness of 3 µm to 8 µm. The total layer thickness of the multilayer wear protection coating system was about 4 µm to 10 µm for bodies or tools according to the first and second embodiments, respectively. The total layer thickness of the multilayer wear protection coating system was about 8 µm to 20 µm for bodies and tools according to the third and fourth embodiments.

The electrical properties were determined by the four-point method according to L. B. Valdes et al. 1954. This resulted in a classification of the diamond coatings according to their specific electrical conductivities as electrically conductive and electrically insulating. The measurements confirmed that the electrical conductivity of the electrically conductive diamond films was 10.13 S/cm or higher. Moreover, the electrical conductivity of the electrically insulating diamond films ranged from $9.8 \times 10^{-6}$ S/cm to $9.2 \times 10^{-9}$ S/cm. Thus, it was confirmed that the electrical conductivity of diamond can be changed without relying on doping.

The grain size of the diamond grains in the corresponding layers was determined by lattice structure analysis via measurement of XRD spectra on a Siemens D5005 X-Ray Diffractometer. The primary radiation corresponded to a monochromatic Cu-$K_\alpha$ radiation with a wavelength of 154.2 pm (1.542 Å). The evaluation of the average diamond grain size was based on the half-width (FWHM) of the diamond (111) peak around $2\theta=43.9°$. Fityk software (version 1.3.1) was used for peak fitting and evaluations. The corresponding values obtained are listed in the tables of FIGS. 9 and 11. It could thus be confirmed that electrically conductive undoped diamond coatings with nanocrystalline structuring, and in particular with diamond grain sizes in the low-nanocrystalline range, are obtained when process conditions A, B or C are applied. In addition, it was confirmed that electrically insulating undoped diamond coatings with diamond grain sizes in the higher-nanocrystalline or low-microcrystalline range are obtained when process conditions D, E, F, G, H and I are applied. Moreover, it has been shown that the CH4 mass flow rate is the main contributor to the diamond grain size design. Thus, using a CH4 mass flow rate of about 90 to 105 sccm results in the formation of nanocrystalline diamond grains in the range of about 5 nm to 6 nm, using a $CH_4$ mass flow rate of about 40 sccm to 45 sccm results in the formation of nanocrystalline diamond grains in the range of about 15 nm to 33 nm, and using a $CH_4$ mass flow rate of about 20 sccm to 25 sccm results in the formation of diamond grains whose largest dimension is greater than 100 nm.

In addition, by selecting the process conditions for the deposition of the outermost layer in the multilayer wear protection coating system according to the first, second, third or fourth embodiment, i.e., the second or fourth undoped diamond layer, the properties of the body or tool can be specifically influenced. For example, the selection of a lower $CH_4$ mass flow rate of about 20 sccm has the effect that the hardness and the modulus of elasticity of the layer are improved, but the surface roughness, and thus the coefficient of friction, are also increased. If, for example, the application to bodies or tools that are exposed to strong frictional forces is desired, then a higher $CH_4$ mass flow rate of about 45 sccm should be used because this results in a lower surface roughness and comparatively lower coefficient of friction.

LIST OF REFERENCE NUMBERS 100, 300, 500, 700 coated body
200, 400, 600, 800 tool
101, 201, 301, 401, 501, 601, 701, 801 multilayer wear protection coating system
102, 302, 502, 702 body
202, 402, 602, 802 tool body
103, 203, 303, 403, 503, 603, 703, 803 first electrically conductive undoped diamond layer
104, 204, 304, 404, 504, 604, 704, 804 second electrically insulating undoped diamond layer
505, 605, 705, 805 third electrically conductive undoped diamond layer
506, 606, 706, 806 fourth electrically insulating undoped diamond layer
307, 407, 707, 807 additional undoped diamond layer Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A coated tool comprising:
   a tool body; and
   a multilayer wear protection coating system that coats a functional surface of the tool body that is subject to wear, wherein the multilayer wear protection coating system includes:
   a first undoped diamond layer; and
   a second undoped diamond layer disposed over the first undoped diamond layer, wherein the first undoped diamond layer is electrically conductive, wherein the first undoped diamond layer is comprised of graphite disposed between diamond grains formed without using doping gas, wherein the diamond grains have a grain size of 15 nm or less, wherein the diamond grains have a crystal structure of bonds based on a $sp^3$-hybridized carbon atomic orbital structure, wherein the first undoped diamond layer exhibits grain boundary conductivity from delocalized electrons, and wherein the second undoped diamond layer is electrically insulating.

2. The coated tool of claim 1, wherein the tool body is made of a metal-ceramic composite.

3. The coated tool of claim 1, wherein the first undoped diamond layer is comprised of diamond grains having a grain size, and wherein the grain size has a range from 4 nm to 10 nm.

4. The coated tool of claim 1, wherein the first undoped diamond layer has a first thickness, wherein the first thickness of the first undoped diamond layer has a range of 4 μm to 20 μm, wherein the second undoped diamond layer has a second thickness, and wherein the second thickness of the second undoped diamond layer has a range of 4 μm to 20 μm.

5. The coated tool of claim 1, wherein the first undoped diamond layer and the second undoped diamond layer are applied by chemical vapor deposition (CVD) using a hot-wire method.

6. The coated tool of claim 1, wherein the tool body is comprised of hard material particles embedded in a binder matrix, wherein the hard material particles include a substance selected from the group consisting of: a carbide, a nitride, a boride, an oxide and a silicide, and wherein the binder matrix includes cobalt or nickel.

7. The coated tool of claim 1, wherein the tool body is comprised of hard material particles that include a compound selected from the group consisting of: a carbide, a nitride, a boride, an oxide and a silicide of a metal of group IV, V or VI of the periodic table of elements.

8. The coated tool of claim 1, wherein the tool body is comprised of a compound selected from the group consisting of: titanium carbide, titanium nitride, titanium carbonitride, tungsten carbide, $(W, Co)_6C$, vanadium carbide, niobium carbide, tantalum carbide, chromium carbide, molybdenum carbide, titanium diboride, zirconium diboride, hafnium diboride, silicon nitride, titanium aluminum nitride, aluminum oxide, zirconium oxide, chromium oxide and $MgAl_2O_4$ spinel.

9. The coated tool of claim 1, wherein the multilayer wear protection coating system further includes an additional undoped diamond layer, wherein the additional undoped diamond layer is electrically insulating, and wherein the additional undoped diamond layer is disposed between the functional surface of the tool body and the first undoped diamond layer.

10. The coated tool of claim 1, wherein the multilayer wear protection coating system further includes a third undoped diamond layer and a fourth undoped diamond layer, wherein the third undoped diamond layer is disposed over the second undoped diamond layer, wherein the fourth undoped diamond layer is disposed over the third undoped diamond layer, wherein the third undoped diamond layer is electrically conductive, and wherein the fourth undoped diamond layer is electrically insulating.

11. The coated tool of claim 1, wherein the coated tool is a rotating, cutting tool.

12. A method of manufacturing a coated tool, comprising:
    applying a first undoped diamond layer over a functional surface of a tool body, wherein the first undoped diamond layer is applied using chemical vapor deposition (CVD) from an atmosphere of methane and hydrogen in a CVD chamber, wherein the first undoped diamond layer is electrically conductive, and wherein the first undoped diamond layer exhibits grain boundary conductivity from delocalized electrons; and
    applying a second undoped diamond layer over the first undoped diamond layer, wherein the second undoped diamond layer is electrically insulating, and wherein as the first undoped diamond layer is applied, a mass flow rate of the methane is maintained in a range of 75-105 standard cubic centimeters per minute.

13. The method of claim 12, wherein the chemical vapor deposition (CVD) is performed using a hot-wire method, and wherein a wire made of tungsten is used in the hot-wire method.

14. The method of claim 12, wherein the hydrogen is admixed with the methane in molar excess of the methane.

15. The method of claim 12, wherein a temperature is maintained in the CVD chamber during the chemical vapor deposition (CVD) between 650° C. and 1100° C., and wherein a pressure is maintained in the CVD chamber during the chemical vapor deposition (CVD) between 1 mbar and 10 mbar.

16. The method of claim 12, wherein the tool body is ceramic.

17. The method of claim 12, wherein the first undoped diamond layer is comprised of diamond grains having a grain size in a range from 4 nm to 10 nm.

18. The method of claim 12, wherein the first undoped diamond layer has a thickness in a range of 4 μm to 20 μm.

19. A method of manufacturing a coated tool, comprising:
    applying a first undoped diamond layer over a functional surface of a tool body, wherein the first undoped diamond layer is formed using chemical vapor deposition (CVD) from an atmosphere of methane and hydrogen in a CVD chamber, wherein the first undoped diamond layer is formed without using doping gas, wherein the first undoped diamond layer is electrically conductive, and wherein the first undoped diamond layer exhibits grain boundary conductivity from delocalized electrons; and
    applying a second undoped diamond layer over the first undoped diamond layer, wherein the second undoped diamond layer is electrically insulating.

* * * * *